United States Patent
Le et al.

(10) Patent No.: US 12,094,086 B2
(45) Date of Patent: Sep. 17, 2024

(54) SYSTEM AND METHOD FOR MULTI-EXPOSURE, MULTI-FRAME BLENDING OF RED-GREEN-BLUE-WHITE (RGBW) IMAGES

(71) Applicant: Samsung Electronics Co., Ltd., Suwon-si (KR)

(72) Inventors: Long N. Le, Richardson, TX (US); Hamid R. Sheikh, Allen, TX (US); John W. Glotzbach, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 240 days.

(21) Appl. No.: 17/587,309

(22) Filed: Jan. 28, 2022

(65) Prior Publication Data

US 2023/0021726 A1 Jan. 26, 2023

Related U.S. Application Data

(60) Provisional application No. 63/222,053, filed on Jul. 15, 2021.

(51) Int. Cl.
*G06T 5/50* (2006.01)
*G06T 5/73* (2024.01)

(52) U.S. Cl.
CPC .......... *G06T 5/50* (2013.01); *G06T 5/73* (2024.01); *G06T 2207/10024* (2013.01); *G06T 2207/20221* (2013.01)

(58) Field of Classification Search
CPC ... G06T 5/50; G06T 5/73; G06T 2207/10024; G06T 2207/20221; G06T 5/92;
(Continued)

(56) References Cited

U.S. PATENT DOCUMENTS 8,384,653 B2 2/2013 Kim et al.
9,124,809 B2 9/2015 Kaizu et al.
(Continued)

FOREIGN PATENT DOCUMENTS

CN 112529824 A 3/2021
KR 10-2009-0021598 A 3/2009
(Continued)

OTHER PUBLICATIONS

J. Li, C. Bai and H. Huang, "Universal Demosaicking for Interpolation-Friendly RGBW Color Filter Arrays," in IEEE Transactions on Image Processing, vol. 32, pp. 3592-3605, 2023, doi: 10.1109/TIP.2023.3286253. (Year: 2023).*
(Continued)

*Primary Examiner* — Charles T Shedrick

(57) ABSTRACT

A method includes obtaining multiple images of a scene using at least one red-green-blue-white (RGBW) image sensor. The method also includes generating multi-channel frames at different exposure levels from the images. The method further includes estimating motion across exposure differences between the different exposure levels using a white channel of the multi-channel frames as a guidance signal to generate multiple motion maps. The method also includes estimating saturation across the exposure differences between the different exposure levels to generate multiple saturation maps. The method further includes using the generated motion maps and saturation maps to recover saturations from the different exposure levels and generate a saturation-free RGBW frame. In addition, the method includes processing the saturation-free RGBW frame to generate a final image of the scene.

20 Claims, 5 Drawing Sheets

(58) Field of Classification Search
CPC . G06T 2207/10144; G06T 2207/20201; G06T 2207/20208; G06T 3/4015; H04N 23/743; H04N 23/951; H04N 5/144
See application file for complete search history.

(56) References Cited

U.S. PATENT DOCUMENTS

| | | | |
|---|---|---|---|
| 9,613,408 | B2 | 4/2017 | Micovic et al. |
| 9,787,909 | B1 | 10/2017 | Hawkins |
| 9,832,389 | B2 | 11/2017 | Min et al. |
| 10,911,691 | B1 | 2/2021 | Le et al. |
| 11,062,436 | B2 | 7/2021 | Pekkucuksen et al. |
| 11,902,669 | B1 * | 2/2024 | Sudret .................. H04N 23/741 |
| 2008/0012969 | A1 | 1/2008 | Kasai et al. |
| 2013/0028509 | A1 | 1/2013 | Moon et al. |
| 2014/0079335 | A1 | 3/2014 | Sun |
| 2015/0062382 | A1 | 3/2015 | Cote et al. |
| 2016/0050354 | A1 | 2/2016 | Musatenko et al. |
| 2016/0358584 | A1 | 12/2016 | Greenebaum et al. |
| 2020/0267300 | A1 | 8/2020 | Zhen et al. |
| 2021/0012755 | A1 | 1/2021 | Narasimha et al. |
| 2021/0073960 | A1 | 3/2021 | Yanagisawa |

FOREIGN PATENT DOCUMENTS

| | | |
|---|---|---|
| KR | 10-2021-0061258 A | 5/2021 |
| WO | 2021101037 A1 | 5/2021 |

OTHER PUBLICATIONS

International Search Report and Written Opinion of the International Searching Authority dated Oct. 19, 2022 in connection with International Patent Application No. PCT/KR2022/010118, 8 pages.
Supplementary European Search Report dated May 8, 2024 in connection with European Patent Application No. 22842424.8, 11 pages.
Kim et al., "Demosaicing of RGBW Color Filter Array Based on Rank Minimization with Colorization Constraint," Sensors 2020, Aug. 2020, 18 pages.

* cited by examiner

SYSTEM AND METHOD FOR MULTI-EXPOSURE, MULTI-FRAME BLENDING OF RED-GREEN-BLUE-WHITE (RGBW) IMAGES

CROSS-REFERENCE TO RELATED APPLICATION AND PRIORITY CLAIM

This application claims priority under 35 U.S.C. § 119(e) to U.S. Provisional Patent Application No. 63/222,053 filed on Jul. 15, 2021, which is hereby incorporated by reference in its entirety.

TECHNICAL FIELD

This disclosure relates generally to image processing systems. More specifically, this disclosure relates to a system and method for multi-exposure, multi-frame blending of red-green-blue-white (RGBW) images.

BACKGROUND

A Bayer color filter array (CFA) pattern is widely used in mobile imaging sensors. However, its limited sensitivity makes it a challenge to use under extreme low-light conditions. Alternatively, a red-green-blue-white (RGBW) sensor includes a CFA pattern having a white color filter along with the red, green, and blue filters. The RGBW CFA pattern is more sensitive and offers a higher signal-to-noise ratio (SNR). A drawback of RGBW is its over-sensitivity of the white (W) channel under high-light conditions, assuming the automatic exposure (AE) logic remains calibrated for RGB.

SUMMARY

This disclosure provides a system and method for multi-exposure, multi-frame blending of red-green-blue-white (RGBW) images.

In a first embodiment, a method includes obtaining multiple images of a scene using at least one red-green-blue-white (RGBW) image sensor. The method also includes generating multi-channel frames at different exposure levels from the images. The method further includes estimating motion across exposure differences between the different exposure levels using a white channel of the multi-channel frames as a guidance signal to generate multiple motion maps. The method also includes estimating saturation across the exposure differences between the different exposure levels to generate multiple saturation maps. The method further includes using the generated motion maps and saturation maps to recover saturations from the different exposure levels and generate a saturation-free RGBW frame. In addition, the method includes processing the saturation-free RGBW frame to generate a final image of the scene.

In a second embodiment, an electronic device includes at least one RGBW image sensor configured to obtain multiple images of a scene. The electronic device also includes at least one processing device configured to generate multi-channel frames at different exposure levels from the images. The at least one processing device is also configured to estimate motion across exposure differences between the different exposure levels using a white channel of the multi-channel frames as a guidance signal to generate multiple motion maps. The at least one processing device is further configured to estimate saturation across the exposure differences between the different exposure levels to generate multiple saturation maps. The at least one processing device is also configured to use the generated motion maps and saturation maps to recover saturations from the different exposure levels and generate a saturation-free RGBW frame. In addition, the at least one processing device is configured to process the saturation-free RGBW frame to generate a final image of the scene.

In a third embodiment, a non-transitory machine-readable medium contains instructions that when executed cause at least one processor of an electronic device to generate multi-channel frames at different exposure levels from multiple images of a scene obtained using at least one RGBW image sensor. The medium also contains instructions that when executed cause the at least one processor to estimate motion across exposure differences between the different exposure levels using a white channel of the multi-channel frames as a guidance signal to generate multiple motion maps. The medium further contains instructions that when executed cause the at least one processor to estimate saturation across the exposure differences between the different exposure levels to generate multiple saturation maps. The medium also contains instructions that when executed cause the at least one processor to use the generated motion maps and saturation maps to recover saturations from the different exposure levels and generate a saturation-free RGBW frame. In addition, the medium contains instructions that when executed cause the at least one processor to process the saturation-free RGBW frame to generate a final image of the scene.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HIVID), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 5, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, a Bayer color filter array (CFA) pattern is widely used in mobile imaging sensors. However, its limited sensitivity makes it a challenge to use under extreme low-light conditions. This is because a Bayer CFA pattern passes different spectra of light, namely red (R), green (G), and blue (B) spectra, to separate pixels. As a result, the red, green, and blue pixels are exposed at a similar level, and all pixels can be under-exposed in extreme low-light conditions. Alternatively, a red-green-blue-white (RGBW) sensor includes a CFA pattern having a white color filter along with the red, green, and blue filters. Stated differently, the RGBW CFA pattern also passes white light, which covers the entire spectrum of the red, green, and blue spectra. Hence, white pixels are exposed more than the red, green, and blue pixels. The RGBW CFA pattern is more sensitive and offers a higher signal-to-noise ratio (SNR). A drawback of RGBW is its over-sensitivity of the white (W) channel under high-light conditions, assuming the automatic exposure (AE) logic remains calibrated for RGB. Conventional techniques are typically limited to single-frame RGBW, which focuses on its sensitivity and resolution/SNR improvement, while largely ignoring the over-sensitive nature of the white channel (by assuming either the exposure is well-conditioned or the dynamic range is sufficiently low).

This disclosure provides systems and methods for multi-exposure, multi-frame blending of RGBW images. As described in more detail below, the systems and methods provide a multi-frame, multi-exposure imaging pipeline where multiple images are captured by an RGBW sensor at different exposures and blended so as to retain the SNR benefit of RGBW while avoiding the issue of over-exposed or saturated pixels in a subset of channels. Using multi-frame, multi-exposure captures, a saturation/over-exposure analysis, and recovery for RGB and W channels, the disclosed systems and methods provide improved levels of exposure for all four RGBW channels. Note that while some of the embodiments discussed below are described in the context of image processing in consumer electronic devices such as smart phones, this is merely one example, and it will be understood that the principles of this disclosure may be implemented in any number of other suitable contexts.

Figure 1:
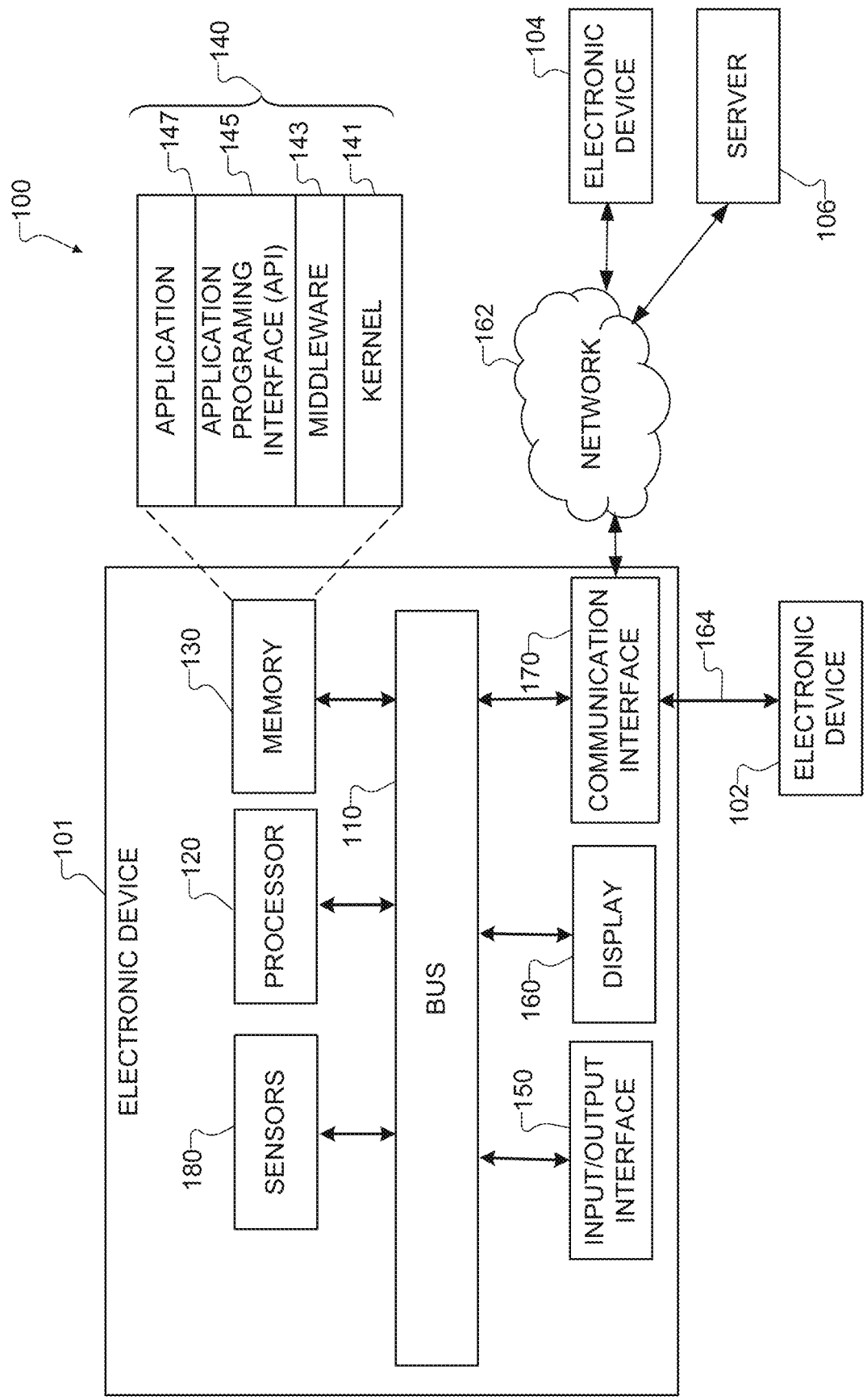
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor 120 can be a graphics processor unit (GPU). As described in more detail below, the processor 120 may perform one or more operations for multi-exposure, multi-frame blending of RGBW images.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for multi-exposure, multi-frame blending of RGBW images as discussed below. These functions can be performed by a single application or by multiple applications that each carry out one or more of these functions. The middleware 143 can function as a relay to allow the API 145 or the application 147 to communicate data with the kernel 141, for instance.

A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 include one or more cameras or other imaging sensors for capturing images of scenes, such as at least one red-green-blue-white (RGBW) image sensor configured to obtain multiple images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

The first external electronic device 102 or the second external electronic device 104 can be a wearable device or an electronic device-mountable wearable device (such as an HMD). When the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving with a separate network. The electronic device 101 can also be an augmented reality wearable device, such as eyeglasses, that include one or more cameras.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for multi-exposure, multi-frame blending of RGBW images.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
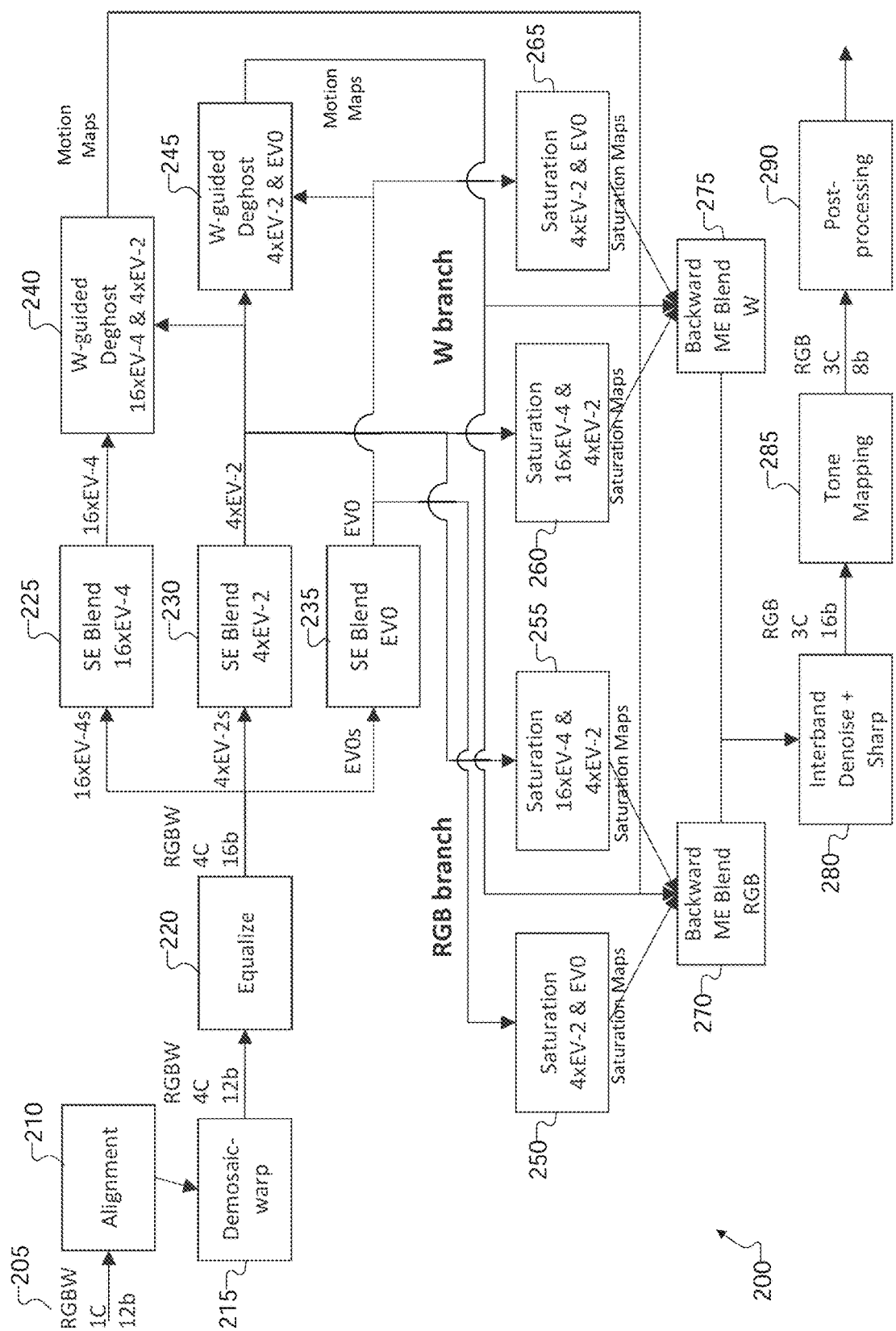
FIG. 2 illustrates an example process for multi-exposure, multi-frame blending of red-green-blue-white (RGBW) images according to this disclosure.

FIG. 2 illustrates an example process 200 for multi-exposure, multi-frame blending of RGBW images according to this disclosure. Note that the process 200 is described as being performed using one or more components of the electronic device 101 described above. However, this is merely one example, and the process 200 could be performed using any other suitable device(s), such as when implemented using the server 106.

As shown in FIG. 2, in the process 200, the electronic device 101 obtains multiple images 205 of a scene. For example, the electronic device 101 can obtain the images 205 in a burst capture operation, meaning the images 205 can be obtained in rapid succession or at or near the same time. The capture operation may be performed in response to an event, such as a user actuating a shutter control or image capture control. In some embodiments, the images 205 are captured using a common image sensor 180 of the electronic device 101, such as a camera having an RGBW sensor. In other embodiments, the images 205 are captured using multiple image sensors 180 of the electronic device 101. In the process 200, the images 205 can be multi-exposure, multi-frame, one-channel (mosaic) raw RGBW images at a twelve-bit depth per pixel (which can be identified as RGBW 1C 12b). However, this is merely one example, and images having other depths or numbers of channels are within the scope of this disclosure.

The electronic device 101 performs an alignment operation 210 on the images 205 to generate motion vectors. Alignment generally refers to aligning different image frames so that common points in the image frames are aligned. This may be useful or desirable since later blending operations may be more successful when the image frames are well-aligned. The alignment operation 210 can include any suitable alignment process, technique, or algorithm for generating motion vectors from images.

The electronic device 101 uses the motion vectors generated during the alignment operation 210 as inputs to a demosaic-warp operation 215. The electronic device 101 performs the demosaic-warp operation 215 to convert the mosaic frames of the image 205 into multi-channel frames (such as four-channel frames). In the demosaic-warp operation 215, the exposure levels of the demosaiced frames can be, for example, EV-4, EV-2, and EV0, although other combinations of exposure levels are possible. The demosaic-warp operation 215 can include any suitable process, technique, or algorithm for converting mosaic frames into multi-channel frames.

The electronic device 101 performs an equalization operation 220 on the multi-channel frames in order to equalize the frames to a common brightness level. In some embodiments, the selected common brightness level is the brightness of the EV0 frames, although other brightness levels could be selected for the common brightness level. During the equalization operation 220, the other frames (such as the EV-4 and EV-2 frames) are equalized to the brightness of the target frame (such as the EV0 frames). In some cases, this results in at most a sixteen-bit depth per pixel. The EV0 frame is already at the desired brightness level, so the EV0 frames may be unchanged in the equalization operation 220 (although again this depends on the desired brightness level). The equalization operation 220 can include any suitable process, technique, or algorithm for equalizing brightness levels in multi-channel frames.

The electronic device 101 groups the multi-channel frames by exposure level and provides the groups of multi-channel frames as inputs to single-exposure (SE) blending operations 225, 230, and 235. Each of the SE blending operations 225, 230, and 235 is performed on a group of multi-channel frames having a common exposure level. For example, the SE blending operation 225 may be performed on the multi-channel frames at the EV-4 exposure, the SE blending operation 230 may be performed on the multi-channel frames at the EV-2 exposure, and the SE blending operation 235 may be performed on the multi-channel frames at the EV0 exposure. In each of the SE blending operations 225, 230, and 235, the multi-channel frames of the corresponding group are blended to generate a single blended image frame. The SE blending operations 225, 230, and 235 represent any suitable process, technique, or algorithm for blending multiple multi-channel frames into a single blended frame. The outputs of the SE blending operations 225, 230, and 235 are a blended, four-channel, 16xEV-4, RGBW image frame; a blended, four-channel, 4xEV-2, RGBW image frame; and a blended, four-channel, EV0 RGBW image frame, respectively, as shown in FIG. 2.

The electronic device 101 also performs W-guided deghosting operations 240 and 245. The W-guided deghosting operations 240 and 245 are performed to identify motion regions among cross-exposure image frames so that blending in those regions can be suppressed. This is useful since blending in motion regions can lead to ghost artifacts. The W-guided deghosting operations 240 and 245 therefore operate to estimate motion across exposure differences. To account for motion between cross-exposure frames, the frames are input to the W-guided deghosting operations 240 and 245 in a forward, pair-wise manner. For example, the 16xEV-4 and 4xEV-2 image frames may be inputs for the W-guided deghosting operation 240, and the 4xEV-2 and EV0 image frames may be inputs for the W-guided deghosting operation 245. As discussed in greater detail below, the outputs of the W-guided deghosting operations 240 and 245 are motion maps for the image frame pairs.

Figure 3:
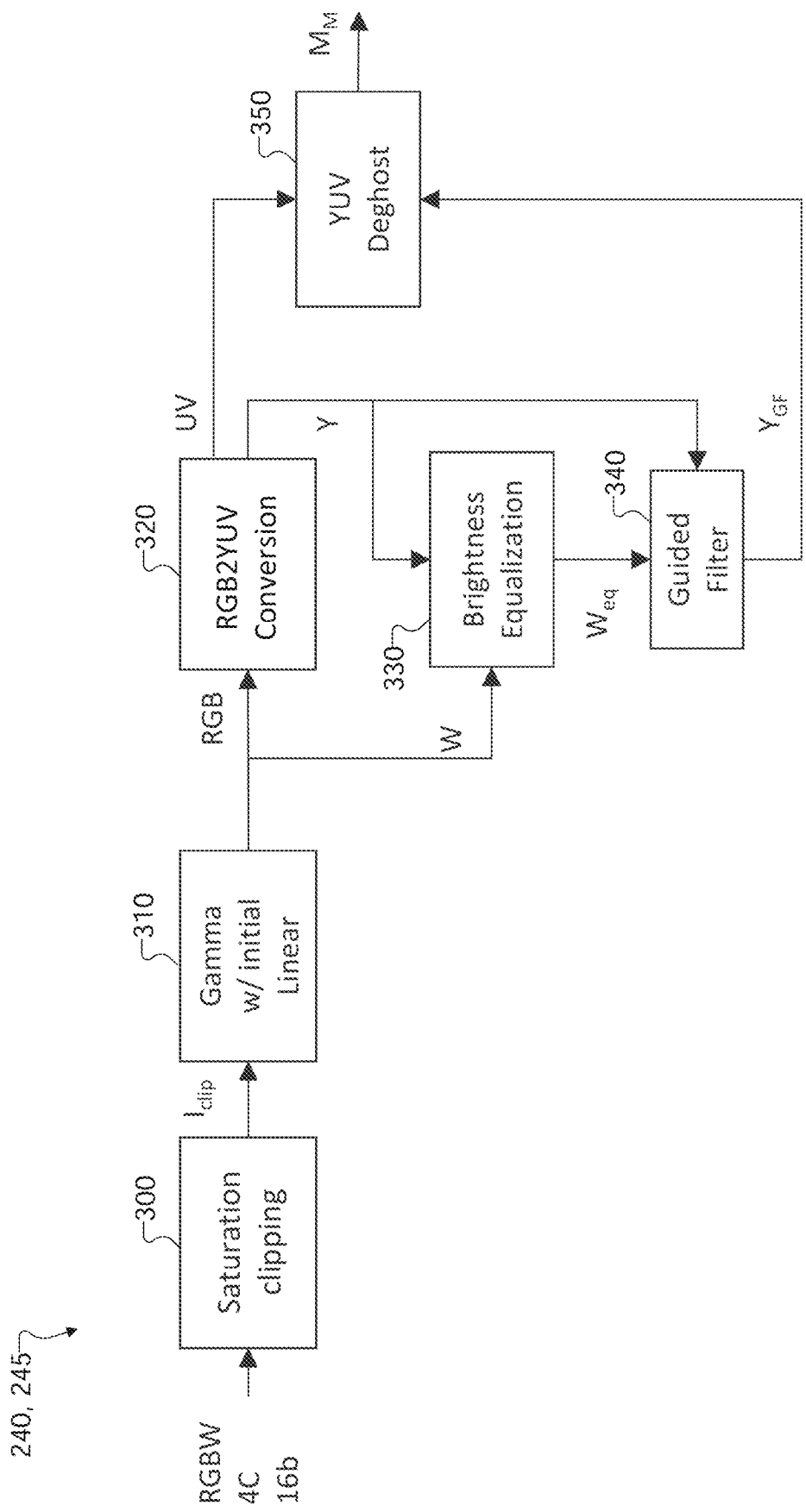
FIG. 3 illustrates an example implementation of W-guided deghosting operations in the process of FIG. 2 according to this disclosure.

The W-guided deghosting operations 240 and 245 can be performed in any suitable manner. FIG. 3 illustrates an example implementation of W-guided deghosting operations 240 and 245 in the process 200 of FIG. 2 according to this disclosure. As shown in FIG. 3, the W-guided deghosting operations 240 and 245 receive the image frame pairs, which are RGBW 4C 16b frames in this example. The electronic device 101 provides the frames as inputs to a saturation clipping operation 300. Since deghosting is performed on cross-exposure image frames, a saturation limit is established to ignore pixel differences due to dynamic range differences. The electronic device 101 performs the saturation clipping operation 300 to differentiate motion-based and range-based pixel differences. As a particular example, the saturation clipping operation 300 may set the saturation limit at an exposure level (such as EV-4) that depends on the exposure value of the next exposure level (such as EV-2) with respect to the reference exposure level (such as EV0). This can be expressed mathematically as follows.

$$I_{clip,16xEV-4} = \min(I_{16xEV-4}, t_{satref} \times 2^{(EV0-EV-2)}) \quad (1)$$

$$I_{clip,4xEV-2} = \min(I_{4xEV-2}, t_{satref} \times 2^{(EV0-EV0)}) \quad (2)$$

where $I_x$ is the input image frame at the given exposure level, $I_{clip,x}$ is the clipped image frame, and $t_{satref}$ is the saturation threshold at the reference EV level (such as EV0). Equation (1) corresponds to the saturation clipping operation 300 for the 16xEV-4 image frames, while Equation (2) corresponds to the saturation clipping operation 300 for the 4xEV-2 image frames. The electronic device 101 also applies a gamma curve with initial linearity 310 on each frame to brighten up contents while avoiding the amplification of dark area noise. The electronic device 101 can apply any suitable gamma curve on each frame.

Unlike conventional RGB deghosting techniques, the W-guided deghosting operations 240 and 245 can achieve higher motion estimation accuracy by exploiting the high-SNR white channel as a guidance signal. Here, the electronic device 101 separately converts each of the red, green, and blue channels of the image frames into Y, U, and V channels using a RGB2YUV conversion operation 320. The outputs of the RGB2YUV conversion operation 320 are Y, U, and V channels of each image frame. The electronic device 101 can perform any suitable process, technique, or algorithm for converting RGB channels to YUV channels. In some embodiments, the conversion operation 320 can be expressed mathematically as follows.

$$Y = 0.2126*R + 0.7152*G + 0.0722*B$$

$$U = -0.09991*R - 0.33609*G + 0.436*B$$

$$V = 0.615*R - 0.55861*G - 0.05639*B \quad (3)$$

In addition, since the white channel is at a different brightness level than the RGB/YUV channels, the white channel can be equalized in brightness before being used as the guidance signal for filtering the Y channel. Accordingly, the electronic device 101 performs a brightness equalization operation 330 on the W channel. Various techniques for the brightness equalization operation 330 may be used. In some embodiments, using the W channel and the Y channel as inputs, the electronic device 101 performs the brightness equalization operation 330 as follows.

$$W_{eq} = W^\gamma, \text{ where } \gamma = \log(Y_{median})/\log(W_{median}) \quad (4)$$

where $W_{eq}$ is the equalized white channel, and $Y_{median}$ and $W_{median}$ are the median values of the Y and W channels respectively.

The electronic device 101 obtains an improved Y channel (identified as $Y_{GF}$) by applying a guided filter operation 340 to the Y channel with $W_{eq}$ as the guidance signal. The guided filter operation 340 is based on a local linear model between the filtering output q and the guidance image I at every pixel i. In some embodiments, this can be expressed as follows.

$$q_i = a_k I_i + b_k, \forall i \in w_k \quad (5)$$

where $a_k$, $b_k$ are linear coefficients to be optimized for a local window $w_k$ centered at pixel k. The filtering output can be optimized to be closest to the input p in a mean-square sense. For example, in some embodiments, $a_k$ and $b_k$ can be expressed as follows.

$$a_k = \frac{\frac{1}{|w_k|}\sum_k I_i p_i - \bar{I}_i \bar{p}_i}{\sigma_k^2 + \varepsilon} \quad (6)$$

$$b_k = \bar{p}_k - a_k \bar{I}_k \quad (7)$$

where $\sigma_k^2$ is the local variance of I in $w_k$. Of course, this is merely one example of the guided filter operation 340. Other suitable processes, techniques, or algorithms are possible and within the scope of this disclosure.

The electronic device 101 further performs a YUV deghosting operation 350 using the $Y_{GF}$ channel and the original U and V channels of the image frames. During the YUV deghosting operation 350, the electronic device 101 processes the $Y_{GF}$, U, and V channels to produce more accurate motion maps $M_M$.

Returning to FIG. 2, in addition to performing the deghosting operations 240 and 245, the electronic device 101 performs multiple saturation operations 250, 255, 260, and 265. The saturation operations 250, 255, 260, and 265 are performed to estimate saturated pixels across exposure differences for both RGB and W channels, thus accounting for saturation between cross-exposure frames. In the saturation operations 250, 255, 260, and 265, the electronic device 101 processes the frames using saturation analysis in a forward, pair-wise manner. Unlike conventional RGB saturation analysis techniques, the saturation analysis in the process 200 is performed differently for RGB and W channels. Thus, the saturation analyses for RGB and W channels are performed separately, resulting in an RGB branch (including the saturation operations 250 and 255) and a W branch (including the saturation operations 260 and 265). Both saturation analyses, however, can follow the same principle: the saturation level at the current exposure level (such as EV-4) depends on the exposure value of the next exposure level (such as EV-2) with respect to the reference exposure level (such as EV0).

As can be seen in this example, the saturation operations 250, 255, 260, and 265 have different input pairs. In this example, the inputs to the saturation operation 250 are the 4xEV-2 and EV0 frames output from the SE blending operations 230 and 235, the inputs to the saturation operation 255 are the 16xEV-4 and 4xEV-2 frames output from the SE blending operations 225 and 230, the inputs to the saturation operation 260 are the 16xEV-4 and 4xEV-2 frames output from the SE blending operations 225 and 230, and the inputs to the saturation operation 265 are the 4xEV-2 and EV0 frames output from the SE blending operations 230 and 235. The outputs of the saturation operations 250, 255, 260, and 265 are saturation maps Ms of the input pairs. In some embodiments, the saturation operation 250 generates a saturation map $M_{S,16xEv-4}$ as follows.

$$M_{S,16xEV-4} = \max(0, \min(1, [\max(I_{RGB}) - t_{satref} \times 2^{(EV0-EV-2)}]/[\sigma_{satref} \times 2^{(EV0-EV-2)}])) \quad (8)$$

Also, in some embodiments, the saturation operation 255 generates a saturation map $M_{S,4xEV-2}$ as follows:

$$M_{S,4xEV-2} = \max(0, \min(1, [\max(I_{RGB}) - t_{satref} \times 2^{(EV0-EV0)}]/[\sigma_{satref} \times 2^{(EV0-EV0)}])) \quad (9)$$

Further, in some embodiments, the saturation operation 260 generates a saturation map $M_{S,16xEv-4}$ as follows:

$$M_{S,16xEV-4}=\max(0,\max(1,[I_W-t_{satref}\times 2^{(EV0-EV-2)}]/[\sigma_{satref}\times 2^{(EV0-EV-2)}])) \quad (10)$$

In addition, in some embodiments, the saturation operation 265 generates a saturation map $M_{S,4xEV-2}$ as follows:

$$M_{S,4xEV-2}=\max(0,\min(1,[I_W-t_{satref}2^{(EV0-EV0)}]/[\sigma_{satref}\times 2^{(EV0-EV0)}])) \quad (11)$$

In Equations (8)-(11), $I_W$ and $I_{RGB}$ represent the white and RGB channels, respectively, of the image frames, $\sigma_{satref}$ is the saturation standard deviation at the reference EV level (such as EV0), and $t_{satref}$ is the saturation threshold at the reference EV level.

Using the motion maps generated in the deghosting operations 240 and 245 and the saturation maps generated in the saturation operations 250, 255, 260, and 265, the electronic device 101 performs backward multi-exposure (ME) blending operations 270 and 275. The electronic device 101 performs the backward ME blending operation 270 to achieve saturation recovery in the RGB branch, and the electronic device 101 performs the backward ME blending operation 275 to achieve saturation recovery in the W branch. The backward ME blending operations 270 and 275 are similar but slightly different processes due to the inclusion of the white channel in the backward ME blending operation 275. The outputs after RGB and W saturation recovery are concatenated to form a saturation-free RGBW frame as discussed below.

Figure 4:
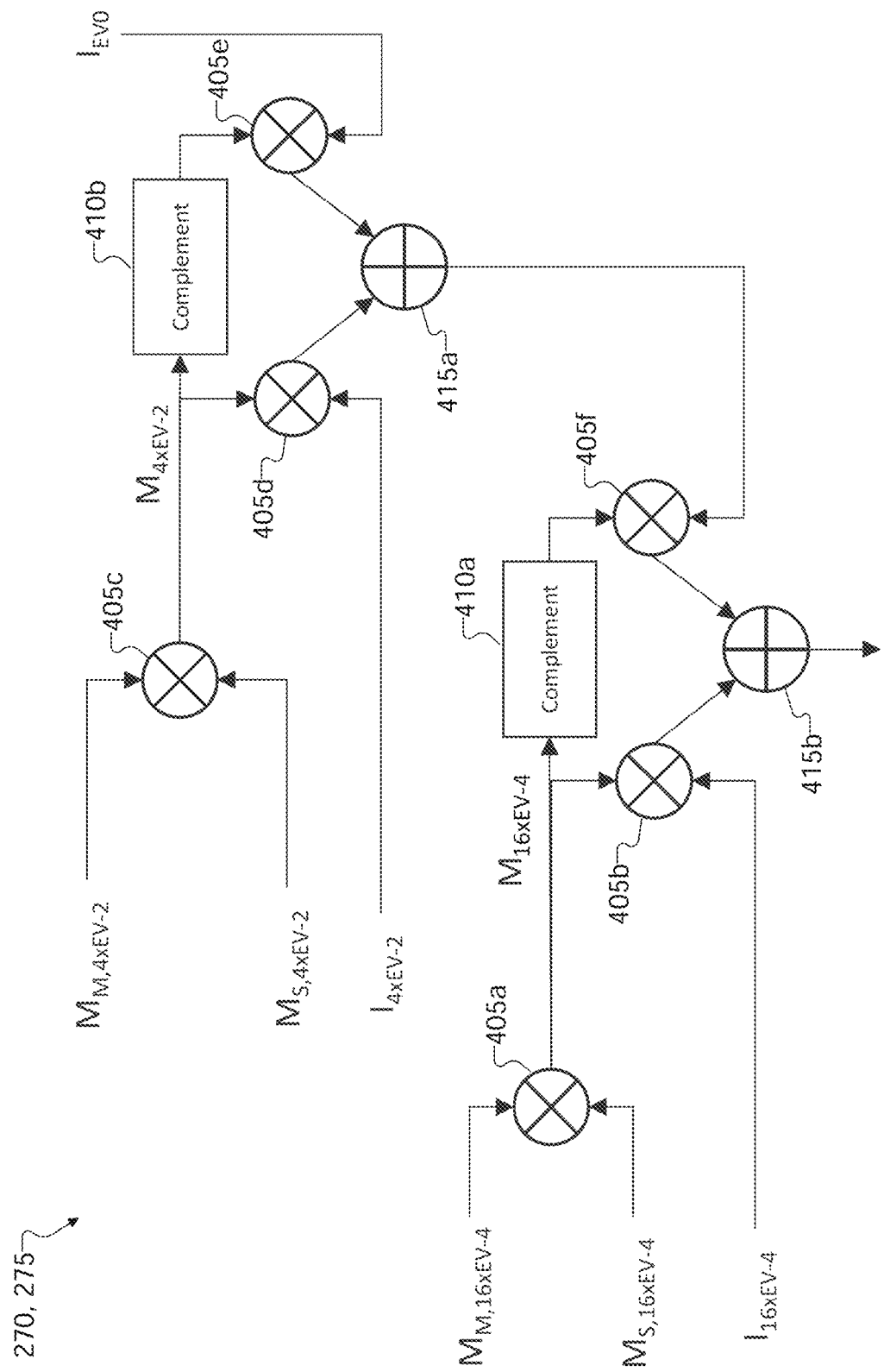
FIG. 4 illustrates an example implementation of backward multi-exposure blending operations in the process of FIG. 2 according to this disclosure.

The backward ME blending operations 270 and 275 can be performed in any suitable manner. FIG. 4 illustrates an example implementation of backward multi-exposure blending operations 270 and 275 in the process 200 of FIG. 2 according to this disclosure. As shown in FIG. 4, the backward ME blending operations 270, 275 recover saturations incrementally from the multiple exposure levels available, starting at the highest EV level (such as EV0) and working to the lowest EV (such as EV-4) (hence the term backward). This incremental approach allows for a more graceful transition between exposure levels in a multi-exposure system, resulting in more natural HDR images.

In this example, the motion map $M_{M,16xEV-4}$ and the saturation map $M_{S,16xEV-4}$ are combined using a multiplier operator 405a to generate a combined map $M_{16xEV-4}$. The combined map $M_{16xEV-4}$ is combined with the image frame $I_{16xEV-4}$ using a multiplier operator 405b. The combined map $M_{16xEV-4}$ is also input to a complement operator 410a, which performs a two's complement operation (such as 1-x) on the combined map $M_{16xEV-4}$. The motion map $M_{M,4xEV-2}$ and the saturation map $M_{S,4xEv-2}$ are combined using a multiplier operator 405c to generate a combined map $M_{4xEV-2}$. The combined map $M_{4xEV-2}$ is combined with the image frame $I_{4xEV-2}$ using a multiplier operator 405d. The combined map $M_{4xEV-2}$ is also input to a complement operator 410b, which performs a two's complement operation on the combined map $M_{4xEV-2}$. The image frame $I_{EV0}$ is combined with the output of the complement operator 410b using a multiplier operator 405e. That output is added to the output of the multiplier operator 405d using a summation operator 415a. The output of the summation operator 415a is combined with the output of the complement operator 410a using a multiplier operator 405f. That output is added to the output of the multiplier operator 405b using a summation operator 415b. The output of the summation operator 415b is either the RGB channels or the W channel of the saturation-recovered image frame, depending on the whether the backward ME blending operation 270 or the backward ME blending operation 275 is performed.

Returning to FIG. 2, the electronic device 101 performs an interband denoise and sharpening operation 280 to fuse the W channel with the RGB channels in the four-channel RGBW image frame to create a three-channel RGB image frame. In some cases, the three-channel RGB image frame may still have a high dynamic range, such as a sixteen-bit depth. The interband denoise and sharpening operation 280 represents any suitable process, technique, or algorithm for fusing a four-channel RGBW image frame into a three-channel RGB image frame.

The electronic device 101 performs a tone mapping operation 285 on the three-channel RGB frame to convert the frame with a display dynamic range (such as a sixteen-bit depth) to a lower bit depth (such as an eight-bit depth). Various techniques may be used to perform the tone mapping operation 285. The electronic device 101 also performs one or more post-processing operations 290 on the three-channel RGB frame with the lower bit depth in order to improve the image quality. Various post-processing techniques may be used in the post-processing operations 290.

Note that the operations and functions shown in FIGS. 2 through 4 can be implemented in an electronic device 101, server 106, or other device in any suitable manner. For example, in some embodiments, the operations and functions shown in FIGS. 2 through 4 can be implemented or supported using one or more software applications or other software instructions that are executed by the processor 120 of the electronic device 101, server 106, or other device. In other embodiments, at least some of the operations and functions shown in FIGS. 2 through 4 can be implemented or supported using dedicated hardware components. In general, the operations and functions shown in FIGS. 2 through 4 can be performed using any suitable hardware or any suitable combination of hardware and software/firmware instructions.

Although FIGS. 2 through 4 illustrate one example of a process 200 for multi-exposure, multi-frame blending of RGBW images and related details, various changes may be made to FIGS. 2 through 4. For example, while the motion maps determined by the W-guided deghosting operations 240 and 245 are shared between the RGB and W branches, the motion maps for RGB and W can be computed separately in other embodiments. For instance, RGB signals can be converted to YUV for the YUV deghosting operation 350. The YUV deghosting operation 350 can also treat the W signal as Y and ignore the chroma effect from U and V. Also, while shown as a specific sequence of operations, various operations shown in FIGS. 2 through 4 could overlap, occur in parallel, occur in a different order, or occur any number of times (including zero times). Further, the specific operations shown in FIGS. 2 through 4 are examples only, and other techniques could be used to perform each of the operations shown in FIGS. 2 through 4. In addition, the W-guided deghosting operations and the backward multi-exposure blending operations may be implemented in any other suitable manner.

Figure 5:
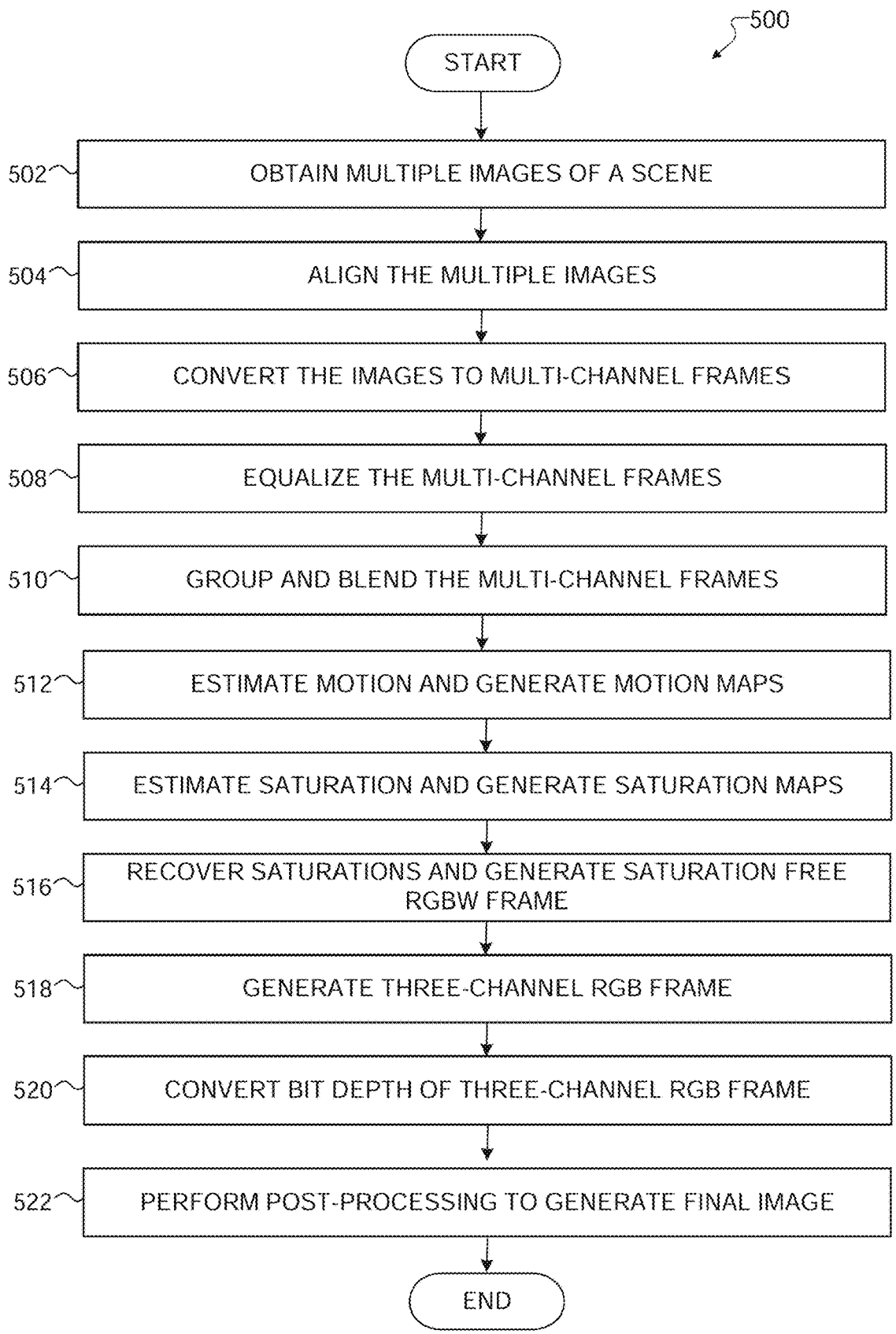
FIG. 5 illustrates an example method for multi-exposure, multi-frame blending of RGBW images according to this disclosure.

FIG. 5 illustrates an example method 500 for multi-exposure, multi-frame blending of RGBW images according to this disclosure. For ease of explanation, the method 500 shown in FIG. 5 is described as involving the use of the process 200 shown in FIGS. 2 through 4 and the electronic device 101 shown in FIG. 1. However, the method 500 shown in FIG. 5 could be used with any other suitable electronic device (such as the server 106) and in any suitable system.

As shown in FIG. 5, multiple images of a scene are obtained using at least one RGBW image sensor at step 502. This could include, for example, the electronic device 101 capturing the images 205 of the scene using at least one RGBW image sensor 180. The multiple images are aligned to generate motion vectors at step 504. This could include, for example, the electronic device 101 performing the alignment operation 210 on the images 205. The images are converted into multi-channel frames using the motion vectors at step 506. This could include, for example, the electronic device 101 performing the demosaic-warp operation 215 to convert the image 205 into multi-channel frames. The multi-channel frames are equalized to a common brightness level at step 508. This could include, for example, the electronic device 101 performing the equalization operation 220 on the multi-channel frames in order to equalize the frames to a common brightness level.

The multi-channel frames are grouped and blended at the different exposure levels at step 510. This could include, for example, the electronic device 101 performing the SE blending operations 225, 230, and 235 on a group of multi-channel frames having a common exposure level. Motion across exposure differences between the different exposure levels is estimated using a white channel of the multi-channel frames as a guidance signal in order to generate multiple motion maps at step 512. This could include, for example, the electronic device 101 performing the W-guided deghosting operations 240 and 245 to generate the motion maps. Saturation across the exposure differences between the different exposure levels is estimated to generate multiple saturation maps at step 514. This could include, for example, the electronic device 101 performing the saturation operations 250, 255, 260, and 265 to generate the saturation maps.

Using the generated motion maps and saturation maps, saturations are recovered from the different exposure levels and a saturation-free RGBW frame is generated at step 516. This could include, for example, the electronic device 101 performing the backward ME blending operations 270 and 275. The W channel is fused with the RGB channels in the saturation-free RGBW frame to generate a three-channel RGB frame at step 518. This could include, for example, the electronic device 101 performing the interband denoise and sharpening operation 280 on the RGBW image frame. The three-channel RGB frame is converted from a first bit depth to a second bit depth at step 520. This could include, for example, the electronic device 101 performing the tone mapping operation 285 on the three-channel RGB image frame. Post-processing is performed on the converted three-channel RGB frame to generate the final image at step 522. This could include, for example, the electronic device 101 performing one or more post-processing operations 290 on the three-channel RGB image frame.

Although FIG. 5 illustrates one example of a method 500 for multi-exposure, multi-frame blending of RGBW images, various changes may be made to FIG. 5. For example, while shown as a series of steps, various steps in FIG. 5 could overlap, occur in parallel, occur in a different order, or occur any number of times.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
    obtaining multiple images of a scene using at least one red-green-blue-white (RGBW) image sensor;
    generating multi-channel frames at different exposure levels from the images;
    estimating motion across exposure differences between the different exposure levels using a white channel of the multi-channel frames as a guidance signal to generate multiple motion maps;
    estimating saturation across the exposure differences between the different exposure levels to generate multiple saturation maps;
    using the generated motion maps and saturation maps to recover saturations from the different exposure levels and generate a saturation-free RGBW frame; and
    processing the saturation-free RGBW frame to generate a final image of the scene.

2. The method of claim 1, wherein generating the multi-channel frames at the different exposure levels from the images comprises:
    aligning the multiple images to generate motion vectors;
    converting the images into the multi-channel frames using the motion vectors;
    equalizing the multi-channel frames to a common brightness level; and
    grouping and blending the multi-channel frames.

3. The method of claim 1, wherein processing the saturation-free RGBW frame to generate the final image of the scene comprises:
    fusing a white channel in the saturation-free RGBW frame with red, green, and blue channels in the saturation-free RGBW frame to generate a three-channel RGB frame;
    converting the three-channel RGB frame from a first bit depth to a second bit depth; and
    post-processing the converted three-channel RGB frame to generate the final image.

4. The method of claim 1, wherein the saturation across the exposure differences between the different exposure levels for the white channel of the multi-channel frames is estimated separately from that for red, green, and blue channels of the multi-channel frames.

5. The method of claim 1, wherein, in estimating the saturation across the exposure differences between the different exposure levels, a saturation level at a current exposure level depends on an exposure value of a next exposure level with respect to a reference exposure level.

6. The method of claim 1, wherein generating the saturation-free RGBW frame comprises:
    multiplying pairs of the generated motion maps and saturation maps at the different exposure levels to generate combined maps; and
    combining the combined maps with the multi-channel frames at the different exposure levels.

7. The method of claim 1, wherein estimating the motion across the exposure differences between the different exposure levels comprises:
    performing saturation clipping on pairs of the multi-channel frames;
    converting red, green, and blue channels of the multi-channel frames to Y, U, and V channels;
    equalizing a brightness of the white channel to correspond to a brightness of the Y channel; and
    performing guided filtering on the Y channel using the white channel as the guidance signal.

8. An electronic device comprising:
at least one red-green-blue-white (RGBW) image sensor configured to obtain multiple images of a scene; and
at least one processing device configured to:
generate multi-channel frames at different exposure levels from the images;
estimate motion across exposure differences between the different exposure levels using a white channel of the multi-channel frames as a guidance signal to generate multiple motion maps;
estimate saturation across the exposure differences between the different exposure levels to generate multiple saturation maps;
use the generated motion maps and saturation maps to recover saturations from the different exposure levels and generate a saturation-free RGBW frame; and
process the saturation-free RGBW frame to generate a final image of the scene.

9. The electronic device of claim 8, wherein, to generate the multi-channel frames at the different exposure levels from the images, the at least one processing device is configured to:
align the multiple images to generate motion vectors;
convert the images into the multi-channel frames using the motion vectors;
equalize the multi-channel frames to a common brightness level; and
group and blend the multi-channel frames.

10. The electronic device of claim 8, wherein, to process the saturation-free RGBW frame to generate the final image of the scene, the at least one processing device is configured to:
fuse a white channel in the saturation-free RGBW frame with red, green, and blue channels in the saturation-free RGBW frame to generate a three-channel RGB frame;
convert the three-channel RGB frame from a first bit depth to a second bit depth; and
post-process the converted three-channel RGB frame to generate the final image.

11. The electronic device of claim 8, wherein the at least one processing device is configured to estimate the saturation across the exposure differences between the different exposure levels for the white channel of the multi-channel frames separately from that for red, green, and blue channels of the multi-channel frames.

12. The electronic device of claim 8, wherein, in estimating the saturation across the exposure differences between the different exposure levels, a saturation level at a current exposure level depends on an exposure value of a next exposure level with respect to a reference exposure level.

13. The electronic device of claim 8, wherein, to generate the saturation-free RGBW frame, the at least one processing device is configured to:
multiply pairs of the generated motion maps and saturation maps at the different exposure levels to generate combined maps; and
combine the combined maps with the multi-channel frames at the different exposure levels.

14. The electronic device of claim 8, wherein, to estimate the motion across the exposure differences between the different exposure levels, the at least one processing device is configured to:
perform saturation clipping on pairs of the multi-channel frames;
convert red, green, and blue channels of the multi-channel frames to Y, U, and V channels;
equalize a brightness of the white channel to correspond to a brightness of the Y channel; and
perform guided filtering on the Y channel using the white channel as the guidance signal.

15. A non-transitory machine-readable medium containing instructions that when executed cause at least one processor of an electronic device to:
generate multi-channel frames at different exposure levels from multiple images of a scene obtained using at least one red-green-blue-white (RGBW) image sensor;
estimate motion across exposure differences between the different exposure levels using a white channel of the multi-channel frames as a guidance signal to generate multiple motion maps;
estimate saturation across the exposure differences between the different exposure levels to generate multiple saturation maps;
use the generated motion maps and saturation maps to recover saturations from the different exposure levels and generate a saturation-free RGBW frame; and
process the saturation-free RGBW frame to generate a final image of the scene.

16. The non-transitory machine-readable medium of claim 15, wherein the instructions that when executed cause the at least one processor to generate the multi-channel frames at the different exposure levels from the images comprise instructions that when executed cause the at least one processor to:
align the multiple images to generate motion vectors;
convert the images into the multi-channel frames using the motion vectors;
equalize the multi-channel frames to a common brightness level; and
group and blend the multi-channel frames.

17. The non-transitory machine-readable medium of claim 15, wherein the instructions that when executed cause the at least one processor to process the saturation-free RGBW frame to generate the final image of the scene comprise instructions that when executed cause the at least one processor to:
fuse a white channel in the saturation-free RGBW frame with red, green, and blue channels in the saturation-free RGBW frame to generate a three-channel RGB frame;
convert the three-channel RGB frame from a first bit depth to a second bit depth; and
post-process the converted three-channel RGB frame to generate the final image.

18. The non-transitory machine-readable medium of claim 15, wherein the instructions when executed cause the at least one processor to estimate the saturation across the exposure differences between the different exposure levels for the white channel of the multi-channel frames separately from that for red, green, and blue channels of the multi-channel frames.

19. The non-transitory machine-readable medium of claim 15, wherein the instructions that when executed cause the at least one processor to generate the saturation-free RGBW frame comprise instructions that when executed cause the at least one processor to:
multiply pairs of the generated motion maps and saturation maps at the different exposure levels to generate combined maps; and
combine the combined maps with the multi-channel frames at the different exposure levels.

20. The non-transitory machine-readable medium of claim 15, wherein the instructions that when executed cause the at least one processor to estimate the motion across the exposure differences between the different exposure levels comprise instructions that when executed cause the at least one processor to:
- perform saturation clipping on pairs of the multi-channel frames;
- convert red, green, and blue channels of the multi-channel frames to Y, U, and V channels;
- equalize a brightness of the white channel to correspond to a brightness of the Y channel; and
- perform guided filtering on the Y channel using the white channel as the guidance signal.

* * * * *